United States Patent [19]

Suzuki et al.

[11] Patent Number: 5,335,216
[45] Date of Patent: Aug. 2, 1994

[54] REPRODUCING APPARATUS REPRODUCING DATA FROM A RECORDING MEDIUM HAVING A PREFORMATTED ADDRESS AREA AT A STARTING POSITION OF EACH SECTOR

[75] Inventors: Hiroshi Suzuki; Takuya Mizokami, both of Odawara; Kikuo Shimizu, Hiratsuka, all of Japan

[73] Assignee: Hitachi, Ltd., Tokyo, Japan

[21] Appl. No.: 60,147

[22] Filed: May 13, 1993

Related U.S. Application Data

[62] Division of Ser. No. 629,418, Dec. 18, 1990, Pat. No. 5,233,592.

[30] Foreign Application Priority Data

Dec. 19, 1989 [JP] Japan .................................. 1-328924

[51] Int. Cl.⁵ .................... H04N 5/76; G11B 27/36; G11B 5/09
[52] U.S. Cl. ........................................ 369/59; 369/54; 360/49
[58] Field of Search .................... 369/47, 48, 53, 54, 369/59; 360/48, 49, 51, 53

[56] References Cited

U.S. PATENT DOCUMENTS

| 4,695,993 | 9/1987 | Takagi et al. | 369/59 |
| 4,811,124 | 3/1989 | Dujari et al. | 369/59 |
| 4,839,878 | 6/1989 | Inoue | 369/54 |
| 4,862,295 | 8/1989 | Tanaka et al. | 369/59 |

*Primary Examiner*—Donald Hajec
*Assistant Examiner*—Won Tae C. Kim
*Attorney, Agent, or Firm*—Kenyon & Kenyon

[57] ABSTRACT

A recording/reproducing apparatus detecting a starting position of each data recording block or sector on a data recording medium, such as an optical disk. A VFO pattern and a CRC code are recorded at a starting position of each of the sectors. The VFO pattern and the CRC code are utilized for detecting a starting position of each sector with no predetermined pattern or sector mark, on the recording medium, which is dedicated for the starting position detection. This improves data formatting efficiency of the recording medium while maintaining the accuracies of automatic focusing and tracking even in a system employing pit-edge recording/reproducing.

24 Claims, 4 Drawing Sheets

FIG. 4A PRIOR ART (1) SECTOR FORMAT (2) CAV DISK

FIG. 4B PRIOR ART (3) MCAV DISK

ZONE  ZONE  ZONE

FIG. 4C PRIOR ART

REPRODUCING APPARATUS REPRODUCING DATA FROM A RECORDING MEDIUM HAVING A PREFORMATTED ADDRESS AREA AT A STARTING POSITION OF EACH SECTOR

This is a divisional of U.S. patent application Ser. No. 07/629,418, filed on Dec. 18, 1990, now U.S. Pat. No. 5,233,592 issued on Aug. 3, 1993.

BACKGROUND OF THE INVENTION

The present invention relates to a recording/reproducing apparatus for detecting a starting position of each data recording block on a data recording medium such as an optical disk, and more particularly to a reliable method for detecting a starting position of each data recording block.

Heretofore in an optical disk apparatus, as shown in FIG. 4(1) of the accompanying drawings, ID areas are provided on a recording medium in which respective track numbers, respective sector numbers and other data necessary for recording-reproducing are recorded in advance, and DATA areas in which user data are to be recorded.

At the starting position of each ID area, a pattern called "a sector mark" (SM) indicating the starting position of a sector (or data recording block) is recorded in a manner different from a data modulating manner. Each sector mark is placed between a gap (GAP) area and an ID area. In the accompanying drawings, the symbol 'A' designates a sector.

Since a detection signal of a sector mark is used as a timing signal for reading and writing, a very high degree of reliability is required for the detection of the sector mark. To secure such high reliability, according to conventional prior art methods, the GAP area ahead of a sector mark is detected to generate a gate signal which predicts the position of the sector mark following the GAP. The sector mark would be detected during a period of time designated by the gate signal.

From the view point as to whether or not the frequency of a recording/reproducing clock is variable, the optical-disk recording/reproducing method can be classified into a CAV (Constant Angular Velocity) method in which the frequency of an optical-disk recording/reproducing clock is unchanged over the entire surface of the disk, as shown in FIG. 4(2) of the accompanying drawings, and an MCAV (Modified CAV) method in which the recording surface of the optical disk is divided into some concentric zones and the frequency of the recording/reproducing clock in an outer zone is higher than that in an inner zone so that the recording capacity of the disk can be increased.

Also, from the view point as to how data bits '1' and '0' are recorded on the disk, the recording/reproducing method is classified into a pit-position recording/reproducing method in which '1' is represented by the position of a pit, as shown in FIG. 3(1), and a pit-edge recording/reproducing method in which '1' is represented by an edge of a pit, as shown in FIG. 3(2).

Figure 3A:
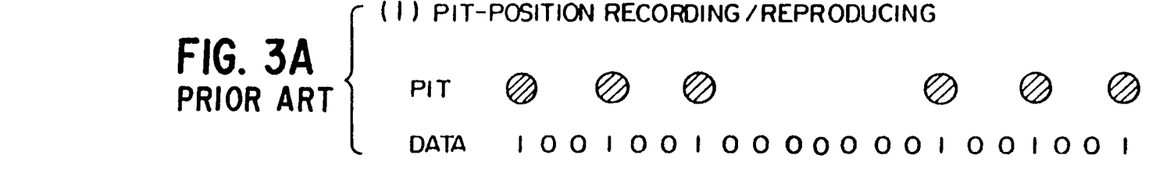
FIG. 3 includes FIG. 3(1) which is a pit diagram showing a prior art pit-position recording/reproducing method and FIG. 3(2) which is a diagram showing a prior art pit-edge recording/reproducing method.
Figure 3B:
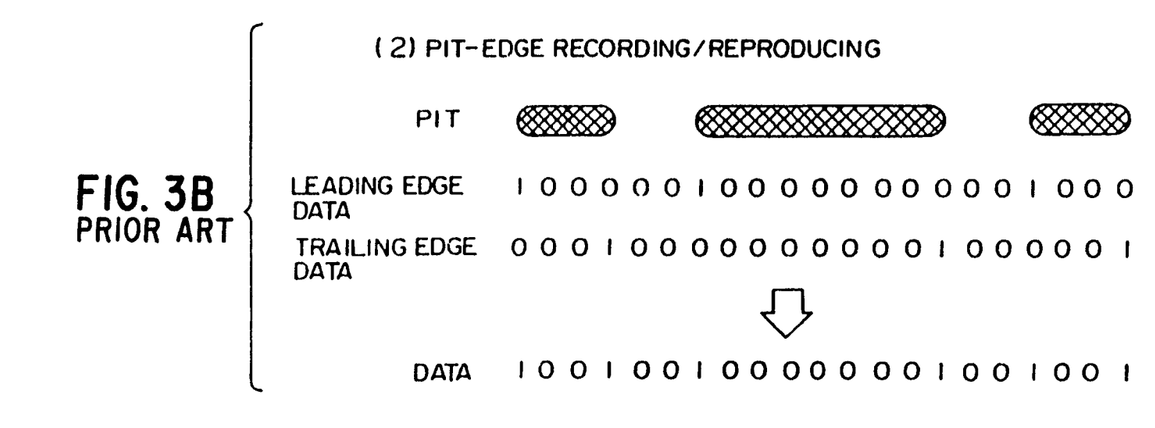
Figure 4A:
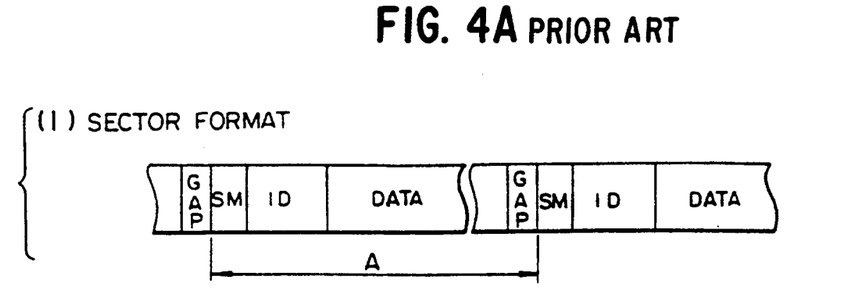
FIG. 4 includes FIG. 4(1), FIG. 4(2) and FIG. 4(3) which are prior art diagrams respectively showing a sector format, a form of CAV disk and a form of MCAV disk.
Figure 4B:
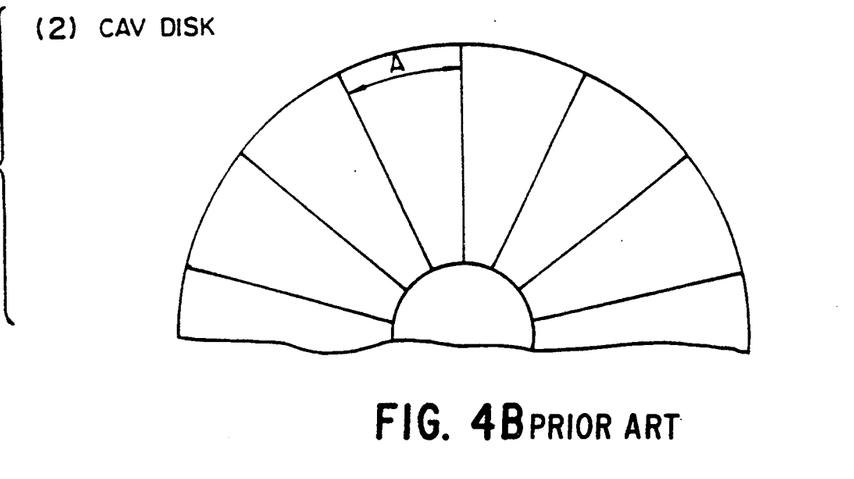
Figure 4C:
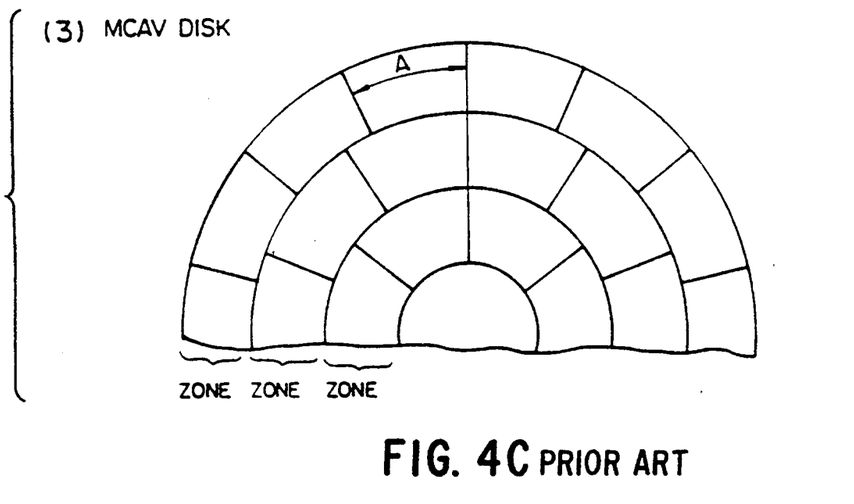

The foregoing prior art system is effective for detecting the sector mark in the pit-position recording/reproducing system regardless of which of the CAV method or the MCAV method is employed therein. However, in the pit-edge recording/reproducing system, the sector mark pattern area would be larger than that in the pit-position recording/reproducing system. In order to make the sector mark pattern different from any of the data patterns, the pits of the sector mark pattern would be elongated in the pit-edge recording/reproducing system as seen from FIG. 3, causing the following problems:

(1) The data formatting efficiency would be lowered. This is because the available storage capacity is lowered by the amount of increase of the sector mark pattern area which causes reduction of the writing area of the user's data.

(2) Automatic focusing accuracy and tracking accuracy would be lowered. This is because the sector mark pattern area in the form of elongated pits reflects a remarkably less amount of light, compared to other areas in the automatic focusing for automatically focusing a light spot on a recording surface of the disk and in the tracking control of the light spot onto grooves of the disk, thus impeding the stability of a servo system.

SUMMARY OF THE INVENTION

The present invention provides a recording/reproducing apparatus for highly reliable detection of a starting position of a data recording block.

A first aspect of the present invention relates to a method for detecting a starting position of a data recording block on a data recording medium on which a VFO pattern and a CRC code are recorded at a starting position of each of the data recording blocks. The starting position of the data recording block is detected by utilizing at least one of the result of detection of the VFO pattern and the result of operation of the CRC.

Preferably, the starting position of the recorded data block is detected such that the VFO pattern first is detected several times in a pull-in state, and then the result of operation of the CRC is utilized in a steady state.

According to a second aspect of the present invention, a recording/reproducing apparatus of a recording medium is provided having an address area preformatted at a starting position of each of the sectors, comprising: means for detecting a predetermined pattern of data pulse train; means for creating a reading timing, at which an associated address is to be read, according to the detection of the predetermined pattern of data pulse train; means for discriminating whether the address thus read is correct or not; and means for creating recording/reproducing timings, for the sector of the address and an address reading timing for the next sector based on the time point when the address is read.

The apparatus preferably further comprises means for generating a mask signal which prohibits the detection of the predetermined pattern of data pulse train for a predetermined period from the time point when the address was correctly read.

Likewise the apparatus may further comprise: means for storing the time point when the address was read; means for calculating a difference between the time point for the previous sector and the time point for the current sector, based on the content of storage of the storing means; and means for generating an address reproducing timing for the next sector based on the calculated difference.

The recording medium may have a plurality of address data at the starting position of each of the sectors, and the difference calculating means may be capable of calculating an immediately previous inter-sector distance from the time point when any of the addresses in the previous sector was read and the time point when any of the addresses in the current sector was read.

In general, at a starting position of a data recording block at a sector on a recording medium such as an optical disk, a VFO pattern is used to create a synchronizing clock and a CRC (Cyclic Redundancy Check) code for discriminating whether an address was read correctly or not. In the present invention, for detecting the starting position of a sector, the result of detection of a VFO pattern and/or the result of calculation of a CRC code are used, without a dedicated pattern such as a sector mark pattern. Further, highly-reliable detection of the starting position of a sector can be realized by additionally using a gate signal to eliminate any misoperation.

Accordingly it is possible to prevent the formatting efficiency from lowering, while maintaining the accuracy of automatic focusing and tracking. Regarding the formatting efficiency, not only since the lowering of the formatting efficiency is prevented, but also since the sector mark itself can be removed, it is possible to positively increase the data writing area.

DETAILED DESCRIPTION

Figure 1:
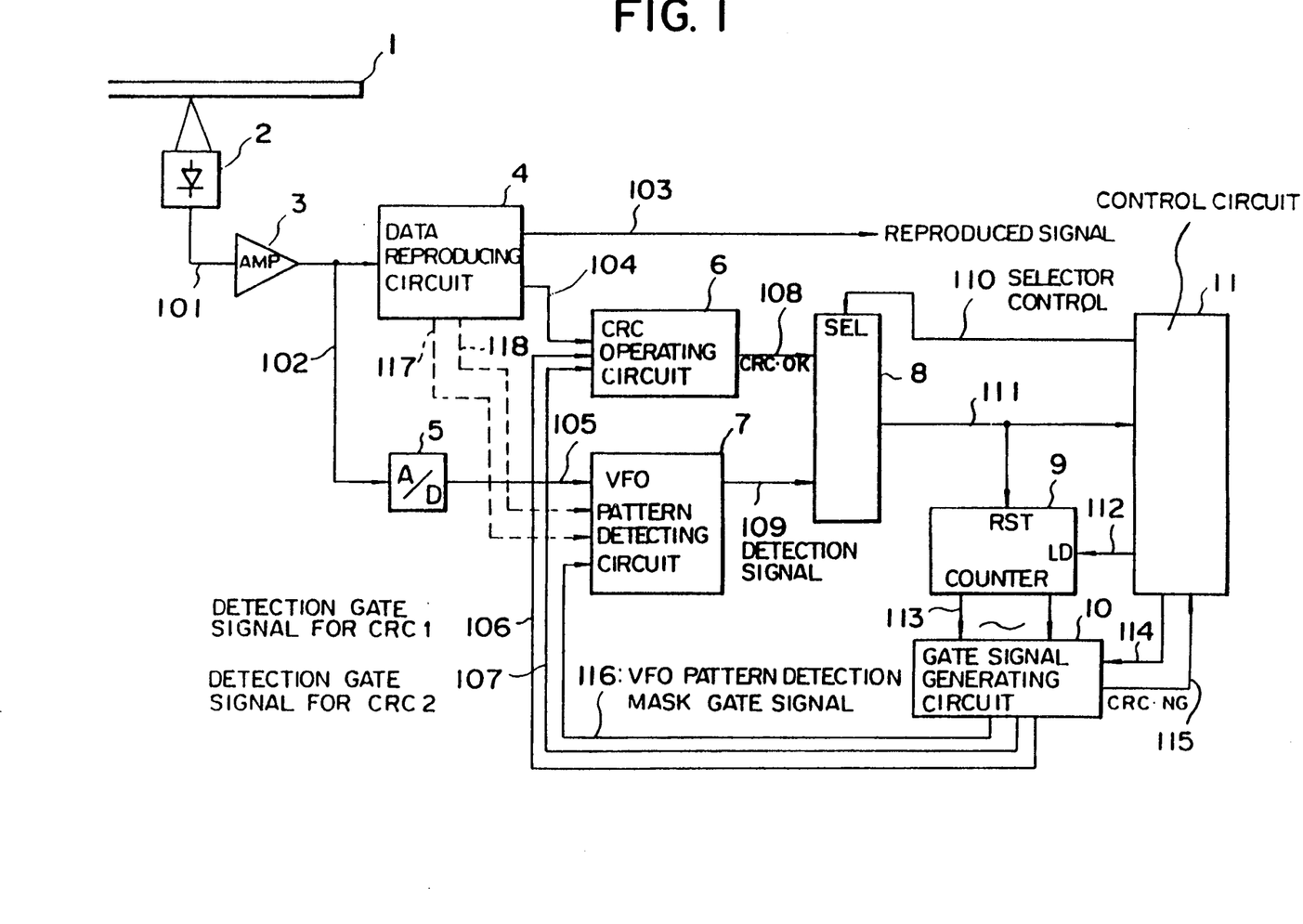
FIG. 1 is a circuit diagram showing a detecting system for detecting a starting position of a sector in which the present invention is incorporated.
Figure 2:
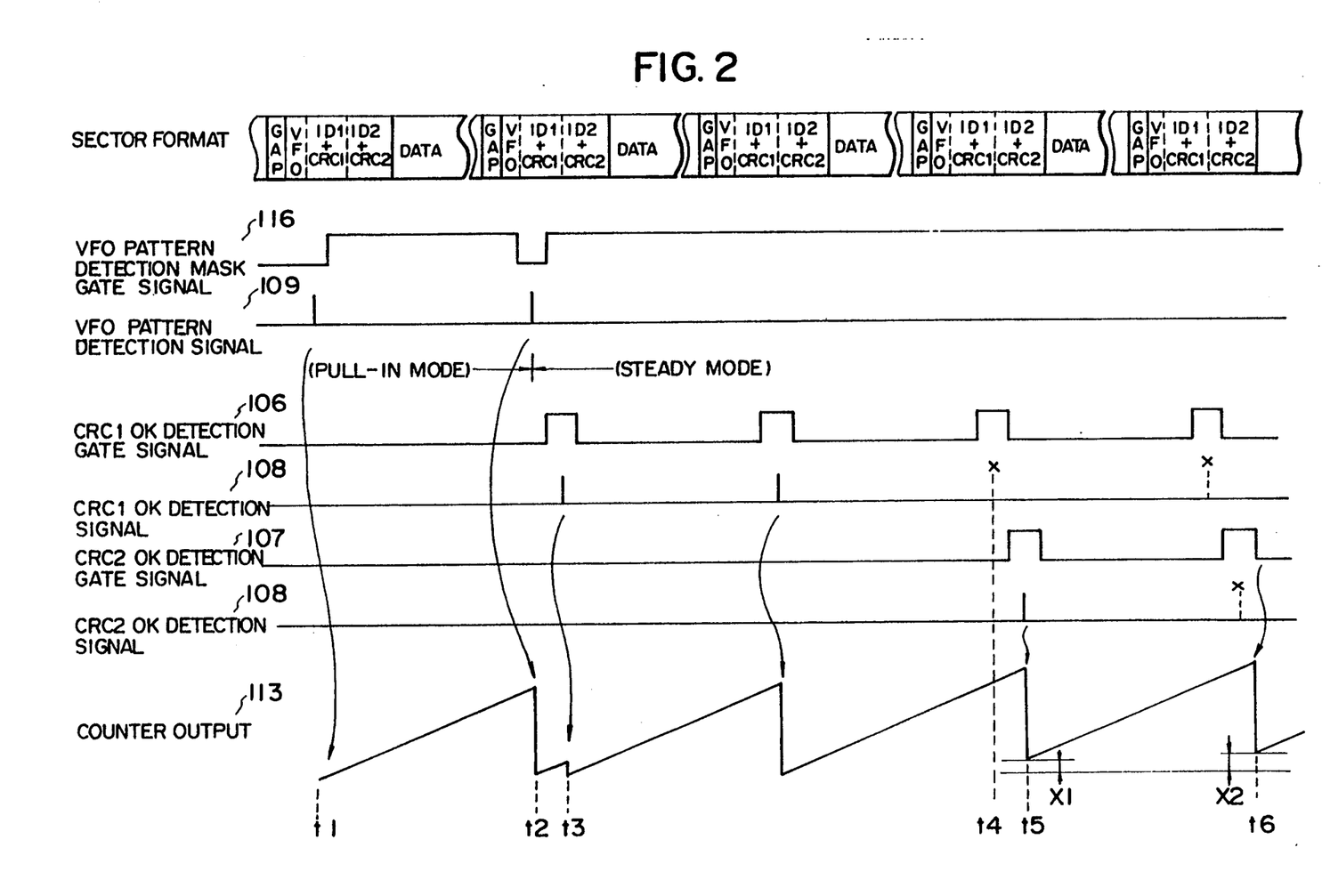
FIG. 2 is a timing chart showing the operation of the detecting system of FIG. 1.

One embodiment of the present invention will now be described in detail with reference to FIG. 1 and FIG. 2. FIG. 1 is a circuit diagram showing a detecting system for detecting a starting position of a sector in which the present invention is incorporated, and FIG. 2 is a timing chart showing the operation of the detecting system of FIG. 1.

FIG. 1 illustrates an optical disk 1, an optical head 2, a preamplifier 3, a data reproducing circuit 4, an analog-to-digital (A/D) converter 5, a CRC operating circuit 6, a VFO pattern detecting circuit 7, a selector 8, a counter 9, a gate signal generating circuit 10, and a control circuit 11 for controlling the detection of the starting position of a sector.

A signal read from the optical disk 1 by the optical head 2 is input through the preamplifier 3 to the A/D converter 5. An amplified signal 102 output by the preamplifier 3 is also input to the data reproducing circuit 4. The data reproducing circuit 4 outputs a reproducing signal 103 and a CRC operation data signal 104. In the meantime, the VFO pattern detecting circuit 7 receives a digital signal 105 output from the A/D converter 5 and detects, at the start of detection of the starting position of a sector, a VFO pattern prerecorded in an ID area, and then outputs a detection signal 109. At that time, a selector control signal 110 causes an output signal 111 of the selector 8 to output the VFO pattern detection signal, with the selector 8 being controlled to be in a mode selecting the VFO pattern detection signal. As shown at a time point t1 in the timing chart of FIG. 2, this signal resets the output 113 of the counter 9 to "0" to initiate counter clocks (not shown) of a constant frequency. Based on this output 113 of the counter 9, the gate signal generating circuit 10 generates a VFO pattern detection mask gate signal 116. This gate signal 116 is a signal that enables the VFO pattern detection signal only during a period of time during which the VFO pattern of the next sector will be predicted to be detected.

When a VFO pattern is detected at the next sector, the output 113 of the counter 9 is reset (time point t2) again to "0" to initiate new counting, to instruct the control circuit 11 to switch the mode from a VFO pattern detecting mode to a CRC1 detecting mode in response to a gate signal control signal 114, while causing the gate signal generating circuit 10 to output a detection gate signal 106 for gating the result of operation of CRC1. Thus a pull-in mode has been completed and this system proceeds into a steady mode.

The CRC operating circuit 6 receives a CRC operation data signal 104 to perform CRC operations. If the result of operation of CRC is OK while the detection gate signal 106 is "1", it turned out in the CRC1 operating circuit 6 that the result of operation of CRC1 is correct, and the circuit 6 outputs a CRC1 OK signal 108. At that time, the selector control signal 110 selects the mode for selecting the CRC1 OK signal 108 to output the CRC1 OK signal as the output signal 111 of the selector 8. This signal 111 causes the output 113 of the counter 9 to be reset (time point t3) again to "0", initiates new counting based on the CRC1 OK signal 108, and then the result of operation of CRC1 of the next sector is monitored.

If the result of operation of the next sector is OK, the CRC1 OK signal 108 is dealt with as a sector's starting position detection signal, so that the signal can be a reference to create various timing signals needed for writing and reading. Creating these various timing signals can be realized by using the counter 9 and the gate signal generating circuit 10.

While monitoring the result of operation of the CRC1, when the result of operation of the CRC1 does not become OK (time point t4) during a period of time during which the CRC1 OK detection gate signal 106 is "1", the gate signal generating circuit 10 reports to the control circuit 11 by a CRC1 NG signal 115 that the result of operation of CRC1 was NG. Upon receipt of this signal, the control circuit 11 outputs to the gate signal generating circuit 10 an instructing signal 114 which causes the circuit 10 to output a gate signal 107 for gating the result of operation of CRC2. The control circuit 11 also outputs to the selector 8 an instructing signal 110 which causes the selector 8 to output the result of operation of CRC2. According to these instructions, the CRC operating circuit 6 operates CRC2 based on the CRC2 operation data signal 104.

If the result of operation of CRC2 is OK while the detection gate signal 107 is "1", it turned out in the CRC2 operating circuit 6 that the result of operation of CRC2 was correct, and outputs a CRC2 OK signal 108. Upon receipt of this signal, the control circuit 11 outputs (time point t5) a correction instructing signal 112 for correcting the output value 113 of the counter 9 by the amount of interval "X1" from CRC1 OK to CRC2 OK. Upon completion of the correction, the counter 9 starts counting and then the result of operation of CRC1 (or the result of operation of CRC2 in the case of CRC1 NG as mentioned above) of the next sector is monitored. Also in this case, the starting position of a sector is regarded to be detected in a pseudo manner with the corrected value of the counter output 113, so that timing signals necessary for writing and reading can be generated without intermission.

If the results of operation of both CRC1 and CRC2 are NG, the gate signal generating circuit gives CRC1 NG and CRC2 NG signals 115 to the control circuit 11, whereupon the control circuit 11 outputs a correction instructing signal 112 to the counter 9 to correct the output value 113 of the counter 9 by the amount of interval "X2" from CRC1 OK to CRC2 NG (time point t6). Also in this case, the starting position of a sector is regarded to be detected in a pseudo manner with the corrected value of the counter output 113, so that timing signals necessary for writing and reading can be generated without intermission.

Detection of the GAP (FIG. 2) ahead of the VFO by the VFO pattern detecting circuit 7 may be prerequisite for detection of a VFO pattern. In this case, instead of gating the VFO pattern detection, the GAP detection may be gated.

Further, if the VFO pattern detecting circuit 7 detects any abnormal number of rotations per unit time from the result of measurement of interval of the CRC1 OK detection (the counter output value 113) or if it is detected that a pair of operations of CRC1 and CRC2 happened to occur successively a predetermined number of times or more, it may effect the generation of correct timing signals necessary for writing and reading. Consequently, it may be done over again from detecting the starting position of a sector in the pull-in mode (VFO pattern detection) so that timing signals necessary for normal writing and reading can be provided.

In the pit-edge recording/reproducing method, the leading edges and trailing edges of a read signal could be reproduced separately. In this case, detection of a VFO pattern is performed from data 117, 118 (FIG. 1) respectively from the leading edge and the trailing edge, and the mode is then shifted to a mode for monitoring the result of operation of CRC, so that timing signals necessary for writing and reading can be provided.

In the illustrated embodiment, in the mode (steady state) for monitoring the result of operation of CRC, the monitoring is performed on the basis of measuring the interval between CRC1 OK and CRC1 OK. Alternatively, the starting position of a sector may be detected on the basis of measuring the interval such as between CRC1 OK and CRC2 OK, between CRC2 OK and CRC2 OK, or between CRC2 OK and CRC1 OK, so that timing signals necessary for writing and reading can be provided.

The detecting system may be further provided with a storage means for storing the time point at which the address was correctly read according to the result of operation of CRC, and another storage means for storing the difference (i.e., the interval between adjacent sectors) between the time point at which the address of the previous sector was read and the time point at which the address of the current sector was read. Based on this stored sector interval, a timing signal for reading the address of the next sector may be issued. If both CRC1 and CRC2 of the sector are NG, it is impossible to calculate the sector interval, in which event the previously stored value can be utilized.

In the case of pit-edge recording/reproducing, detections of a data pulse and a GAP may be performed by a first-order differential signal of the reproduced signal. In this case, detection of a data pulse or the like may be performed for the signal after the gain of the reproduced signal has been controlled (AGC: Automatic Gain Control).

Though the present invention is suitable when incorporated in an optical disk apparatus implementing edge recording/reproducing, it is a feature of the present invention to detect the starting position of a data recording block without a sector mark. In this sense, the present invention may also be adopted to the pit-position recording/reproducing method and then to a recording medium other than an optical disk.

As mentioned above, according to the present invention, it is possible to detect a VFO pattern in an ID area, and to secure the high reliability in detecting the starting position of a sector by regarding the result of operation of CRC as the result of detection of the sector's starting position, without a pattern such as a sector mark dedicated for detecting the starting position of a sector. Therefore, if the present invention is incorporated in an optical disk apparatus adopting pit-edge recording/reproducing, it is possible to improve the data formatting efficiency while maintaining the automatic focusing and tracking accuracy.

What is claimed is:

1. A reproducing apparatus of a recording medium having an address area preformatted at a starting position of each of a plurality of sectors, the apparatus comprising:

pattern detection means for detecting a predetermined pattern of a data pulse train in said starting position of each sector;

timing creation means for creating a reading timing, at which an address of a sector is to be read, according to the detection of said predetermined pattern of the data pulse train; and discrimination means for discriminating whether an address read from said recording medium based on said reading timing created by said timing creation means is correct or not;

wherein said timing creation means creates reproducing timings for the sector of said address and an address reading timing for a next sector which follows said sector, based on a point in time when said address is read.

2. A reproducing apparatus according to claim 1, wherein said timing creation means includes a counter which counts a predetermined count while being reset by an output from said pattern detecting means, and gating means responsive to the output from said counter for generating a mask signal which inhibits the detection of said predetermined pattern for a predetermined period from the point in time when said predetermined pattern has been detected.

3. A reproducing apparatus according to claim 2, further comprising a selector for selecting an output from said pattern detection means and said discrimination means, and control means for controlling selection of said selector to select a predetermined number of successive outputs from said pattern detection means at an initial stage of beginning to detect start positions of successive sectors on said recording medium, and then to select successive outputs from said discrimination means.

4. A reproducing apparatus according to claim 3, wherein each sector includes at the starting position thereof first and second CRC codes respectively attached to two same addresses of said sector and wherein said discrimination means checks the first address on the basis of the first CRC code and then checks the second address on the basis of the second CRC code only when the check of said first address has resulted in failure.

5. A reproducing apparatus according to claim 4, wherein when said selector issues an output from said discrimination means which indicates said second address being successfully checked on the basis of said second CRC code, said counter is reset with a predetermined value which is equal to a value said counter would take at that time if said counter had been reset by detection of a successful check of said first address.

6. A reproducing apparatus according to claim 5, further comprising means responsive to an output of said counter to generate first and second gate signals which enable said discrimination means to check said first and second addresses respectively within predetermined periods within which respective successful checks of said first and second addresses are expected to occur.

7. A reproducing apparatus according to claim 5, wherein when the check of said second address results in failure on the basis of said second CRC code, said counter is reset with a predetermined value which is equal to a value said counter would take at that time if said counter had been reset by detection of a successful check of said first address.

8. A reproducing apparatus according to claim 7, wherein said control means causes said selector to select the output from said pattern detection means when unsuccessful detections of both of said first and second addresses have successively occurred a predetermined number of times.

9. A reproducing apparatus according to claim 1, further comprising:
 storing means for successively storing data indicating the point in time when said address has correctly been read; and
  difference calculating means for calculating a difference between said point in time for a previous sector and said point in time for a current sector, based on a content of said storing means;
 wherein said timing creation means generates said address reading timing for said next sector based on the calculated difference.

10. A reproducing apparatus according to claim 9, wherein said recording medium has first and second same addresses at the starting position of each of said sectors, and wherein said difference calculating means is capable of calculating an immediately previous intersector distance from the point in time when one of said first and second addresses in the previous sector was read and the point in time when one of said first and second addresses in the current sector has been read.

11. A reproducing apparatus according to claim 1, wherein each sector includes at the starting position thereof a CRC code attached to the address of said sector and said discrimination means discriminates whether said address is correct or not on the basis of said CRC code.

12. A reproducing apparatus according to claim 11, wherein said timing creation means includes a counter which counts a predetermined clock while being reset by an output from said pattern detection means, and further comprising means responsive to an output of said counter to generate a gate signal which enables said discrimination means to check said address within a predetermined period within which a successful check of said address is expected to occur.

13. A reproducing apparatus of a recording medium having an address area preformatted at a starting position of each of a plurality of sectors at which a VFO pattern and an address of the sector are recorded, said apparatus comprising:
 pattern detection means for detecting the VFO pattern in said starting position of each sector; and
 timing creation means for creating an address reading timing for a sector which follows a preceding sector whose VFO pattern point has been detected by said pattern detection means, based on a time point of detection of said VFO pattern of said preceding sector;
 said timing creation means creating an address reading timing for a sector which follows the sector whose address has been read, based on a time point when said address has been read, and also creating reproducing timings for a data area of the sector whose address has been read, based on a time point when said address has been read.

14. A reproducing apparatus according to claim 13, wherein said timing creation means includes a counter which counts a predetermined clock while being reset by an output from said pattern detection means.

15. A reproducing apparatus according to claim 13, further comprising means for generating a mask signal which inhibits the detection of said VFO pattern by said VFO pattern detection means for a predetermined period from the time point when said VFO pattern has been detected.

16. A reproducing apparatus of a recording medium having an address area performatted at a starting position of each of a plurality of sectors at which an address of the sector and a CRC code corresponding to said address are recorded, said apparatus comprising:
 discrimination means for checking an address read from said address area of said recording medium on the basis of said CRC code corresponding to said address to determine whether said address has correctly been read; and
 timing creation means for creating an address reading timing for a sector which follows the sector whose address has been read, based on a time point when said address has correctly been read;
 said timing creation means creating reproducing timings for a data area of the sector whose address has correctly been read, based on a time point when said address has correctly been read.

17. A reproducing apparatus according to claim 16, wherein each sector includes at the starting position thereof first and second CRC codes respectively attached to two same addresses and wherein said discrimination means checks the first address on the basis of the first CRC code and then checks the second address on the basis of the second CRC code when the check of said first address has resulted in failure.

18. A reproducing apparatus according to claim 17, wherein said timing creation means includes a counter which counts a predetermined clock while being reset by an output from said discrimination means.

19. A reproducing apparatus according to claim 18, wherein when said discrimination means issues a signal indicative of said second address being successfully checked on the basis of said second CRC code, said counter is reset with a predetermined value which is equal to a value said counter would take at that time if said counter had been reset by detection of a successful check of said first address.

20. A reproducing apparatus according to claim 19, further comprising means responsive to an output of said counter to generate first and second gate signals which enable said discrimination means to check said first and second addresses respectively within predetermined periods within which respective successful checks of said first and second addresses are expected to occur.

21. A reproducing apparatus according to claim 19, wherein when the check of said second address results in failure on the basis of said second CRC code, said counter is reset with a predetermined value which is equal to a value said counter would take at that time if said counter had been reset by detection of a successful check of said first address.

22. A reproducing apparatus for reproducing data from a disc medium having thereon a plurality of tracks each being divided into a plurality of sectors, each of said sectors having an identification (ID) area and a data area in which an address unique to said sector and user data are respectively recorded, said ID area of each sector being preformatted with a VFO pattern, which is used to generate a synchronization clock for recording to and reproducing from said sector, and a CRC code which is used to check the address of said sector whether said address has correctly been read, said apparatus comprising:

reproducing means for reproducing data on a sector of said disc medium;

CRC operation means for performing a CRC operation to an address recorded in the ID area of said sector which is contained in said data reproduced by said reproducing means;

counting means for performing a counting operation according to a result of said CRC operation; and starting-position indication means for generating a reference signal which provides a reference of a starting position of a given sector when said CRC operation of a sector preceding said given sector has successfully resulted and said CRC operation of said given sector successfully results by a time at which a count of said counting means reaches a predetermined value.

23. A reproducing apparatus according to claim 22, wherein said ID area in each sector of said disc medium includes a plurality of addresses unique to said sector along with a plurality of corresponding CRC codes, and said starting-position indication means treats said CRC operations with respect to said plurality of addresses of a sector as being successful if at least one of said CRC operations successfully results.

24. A reproducing apparatus according to claim 22, wherein said counting means includes a counter which counts a predetermined clock while being reset by an output from said CRC operation means which indicates a successful result of said CRC operation.

* * * * *

UNITED STATES PATENT AND TRADEMARK OFFICE
CERTIFICATE OF CORRECTION

PATENT NO. : 5,335,216
DATED : August 2, 1994
INVENTOR(S) : Hiroshi Suzuki, et al.

It is certified that error appears in the above-indentified patent and that said Letters Patent is hereby corrected as shown below:

Column 4, change "point 12)" to --point t2)--.

Signed and Sealed this

Fourteenth Day of February, 1995

Attest:

BRUCE LEHMAN

*Attesting Officer*     *Commissioner of Patents and Trademarks*